United States Patent
Kudyshev et al.

(10) Patent No.: US 12,159,369 B2
(45) Date of Patent: Dec. 3, 2024

(54) MACHINE LEARNING ASSISTED SUPER RESOLUTION MICROSCOPY

(71) Applicant: Purdue Research Foundation, West Lafayette, IN (US)

(72) Inventors: Zhaxylyk A. Kudyshev, West Lafayette, IN (US); Demid Sychev, West lafayette, IN (US); Zachariah Olson Martin, West Lafayette, IN (US); Simeon I. Bogdanov, West Lafayette, IN (US); Xiaohui Xu, West Lafayette, IN (US); Alexander Kildishev, West Lafayette, IN (US); Alexandra Boltasseva, West Lafayette, IN (US); Vladimir Shalaev, West Lafayette, IN (US)

(73) Assignee: Purdue Research Foundation, West Lafayette, IN (US)

(*) Notice: Subject to any disclaimer, the term of this patent is extended or adjusted under 35 U.S.C. 154(b) by 379 days.

(21) Appl. No.: 17/858,722

(22) Filed: Jul. 6, 2022

(65) Prior Publication Data
US 2023/0177642 A1    Jun. 8, 2023

Related U.S. Application Data

(60) Provisional application No. 63/285,252, filed on Dec. 2, 2021.

(51) Int. Cl.
*G06T 3/40* (2024.01)
*G02B 21/00* (2006.01)
(Continued)

(52) U.S. Cl.
CPC ........ *G06T 3/4053* (2013.01); *G02B 21/0072* (2013.01); *G06T 3/4046* (2013.01)

(58) Field of Classification Search
CPC .. G06T 3/4053; G06T 3/4046; G02B 21/0072
See application file for complete search history.

(56) References Cited

U.S. PATENT DOCUMENTS 11,892,613 B2 * 2/2024 Oron ............... G02B 21/0072
2019/0236778 A1 * 8/2019 Saigo ................ G06V 20/69

OTHER PUBLICATIONS

Kudyshev et al., "Rapid classification of quantum sources enabled by machine learning", Advanced Quantum Technologies, Sep. 2, 2020 (Year: 2020).*

(Continued)

*Primary Examiner* — Qian Yang
(74) *Attorney, Agent, or Firm* — Piroozi-IP, LLC

(57) ABSTRACT

A method of providing super-resolved images of a photon emitting particle is disclosed, which includes providing a machine-learning (ML) platform, wherein the ML platform is configured to receive pixel-based sparse autocorrelation data and generate a predicted super-resolved image of a photon emitting particle, receiving photons from the photon emitting particle by two or more photon detectors, each generating an electrical pulse associated with receiving an incident photon thereon, generating sparse autocorrelation data from the two or more photon detectors for each pixel within an image area, and inputting the pixel-based sparse autocorrelation data to the ML platform, thereby generating a predicted super-resolved image of the imaging area, wherein the resolution of the super-resolved image is improved by $\sqrt{n}$ as compared to a classical optical microscope limited by Abbe diffraction limit.

20 Claims, 13 Drawing Sheets
(13 of 13 Drawing Sheet(s) Filed in Color)

(51) Int. Cl.
  *G06T 3/4046* (2024.01)
  *G06T 3/4053* (2024.01)

(56) References Cited

OTHER PUBLICATIONS

Tenne et al., "Super-resolution enhancement by quantum image scanning microscopy" Nature Photonics vol. 13, pp. 116-122 (2019) (Year: 2019).*

Li et al. "Fast correlated-photon imaging enhanced by deep learning", vol. 8, No. 3 / Mar. 2021 / Optica (Year: 2021).*

Abmann, "Quantum-Optically Enhanced Storm (Quest) for Multi-Emitter Localization", Scientific Reports | (2018) 8:7829 (Year: 2018).*

Gatto Monticone et al., "Beating the Abbe Diffraction Limit in Confocal Microscopy via Nonclassical Photon Statistics," Phys. Rev. Lett. 113, 143602 (2014).

Cui et al., "Quantum Statistical Imaging of Particles without Restriction of the Diffraction Limit," Phys. Rev. Lett. 110, 153901 (2013).

Tenne et al., "Super-resolution enhancement by quantum image scanning microscopy," Nat. Photonics 13, 116-122 (2019).

Yang et al., "Far-field linear optical superresolution via heterodyne detection in a higher-order local oscillator mode", Opt. Express 24, 3684-3701 (2016).

Hsu et al., "Optimal optical measurement of small displacements," J. Opt. B 6, 495-501 (2004).

Taylor et al., "Biological measurement beyond the quantum limit," Nat. Photonics 7, 229-233 (2013).

Rayleigh, "XXXI. Investigations in optics, with special reference to the spectroscope," London, Edinburgh, Dublin Philos. Mag. J. Sci. 8, 261-274 (1879).

E. Abbe, "Beiträge zur Theorie des Mikroskops und der mikroskopischen Wahrnehmung," Arch. für Mikroskopische Anat. 9, 413-468 (1873).

Huang et al., "Super-Resolution Fluorescence Microscopy," Annu. Rev. Biochem. 78, 993-1016 (2009).

Hell, "Far-Field Optical Nanoscopy," Science (80-. ). 316, 1153-1158 (2007).

Rogers et al., P. J. S. Smith, and N. I. Zheludev, "Far-field unlabeled super-resolution imaging with superoscillatory illumination," APL Photonics 5, 066107 (2020).

Huang et al., "Super-Resolution without Evanescent Waves," Nano Lett. 9, 1249-1254 (2009).

Chen et al., "Superoscillation: from physics to optical applications," Light Sci. Appl. 8, 56 (2019).

Hell et al., "Breaking the diffraction resolution limit by stimulated emission: stimulated-emission-depletion fluorescence microscopy," Opt. Lett. 19, 780 (1994).

Gustafsson, "Surpassing the lateral resolution limit by a factor of two using structured illumination microscopy. Short Communication," J. Microsc. 198, 82-87 (2000).

Betzig et al., O. W. Lindwasser, S. Olenych, J. S. Bonifacino, M. W. Davidson, J. Lippincott-Schwartz, and H. F. Hess, "Imaging Intracellular Fluorescent Proteins at Nanometer Resolution," Science (80-. ). 313, 1642-1645 (2006).

Rust et al., "Sub-diffraction-limit imaging by stochastic optical reconstruction microscopy (Storm)," Nat. Methods 3, 793-796 (2006).

Tsang, "Quantum limits to optical point-source localization," Optica 2, 646 (2015).

Tsang et al., "Quantum Theory of Superresolution for Two Incoherent Optical Point Sources," Phys. Rev. X 6, 031033 (2016).

Classen et al., "Superresolution via structured illumination quantum correlation microscopy," Optica 4, 580 (2017).

Israel et al., "Quantum correlation enhanced superresolution localization microscopy enabled by a fibre bundle camera," Nat. Commun. 8, 14786 (2017).

Kolobov et al., "Quantum Limits on Optical Resolution," Phys. Rev. Lett. 85, 3789-3792 (2000).

Tsang, "Quantum Imaging beyond the Diffraction Limit by Optical Centroid Measurements," Phys. Rev. Lett. 102, 253601 (2009).

Hell, et al., "Two- and multiphoton detection as an imaging mode and means of increasing the resolution in far-field light microscopy: A study based on photon-optics," Bioimaging 3, 64-69 (1995).

Schwartz et al., "Superresolution Microscopy with Quantum Emitters," Nano Lett. 13, 5832-5836 (2013).

* cited by examiner

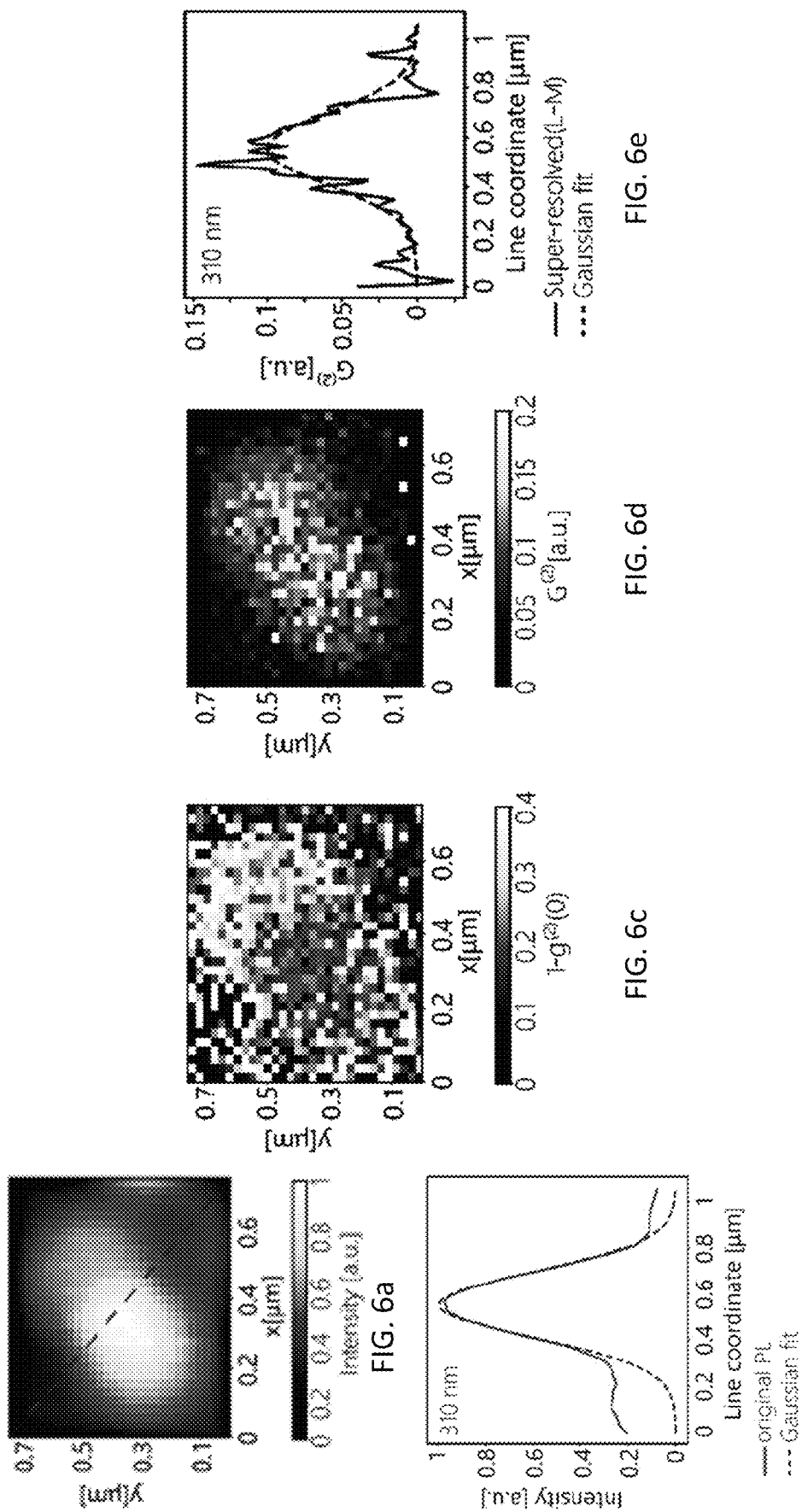

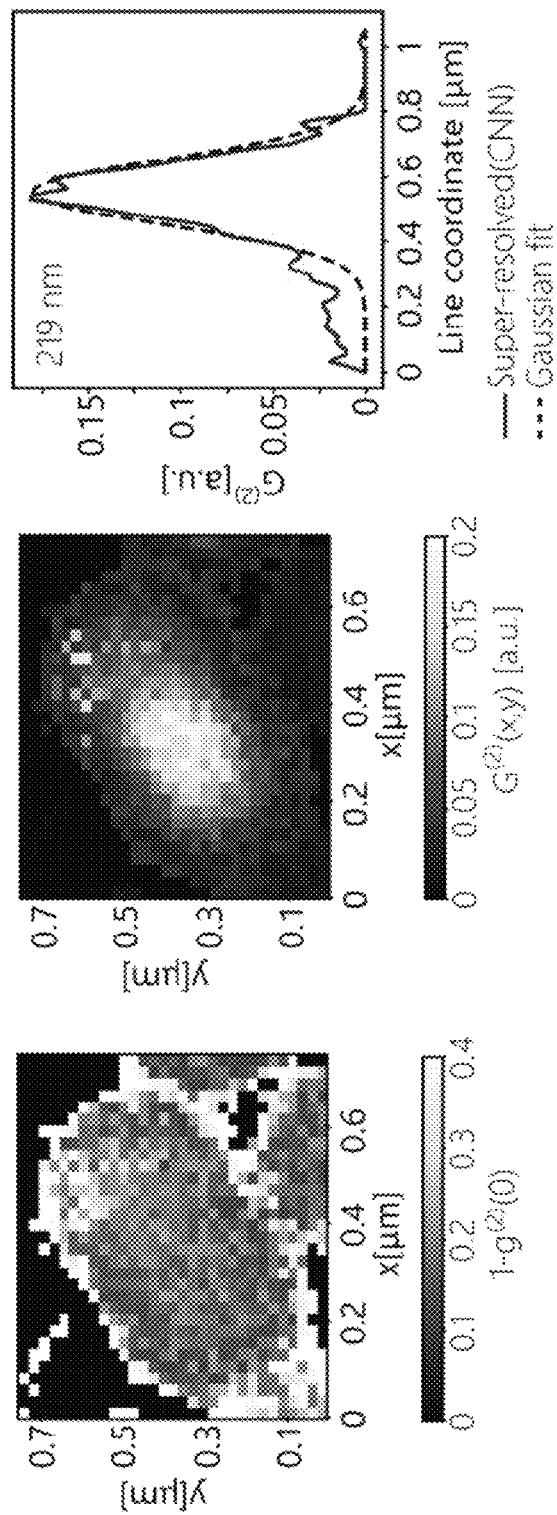

MACHINE LEARNING ASSISTED SUPER RESOLUTION MICROSCOPY

CROSS-REFERENCE TO RELATED APPLICATIONS

The present patent application is related to and claims the priority benefit of U.S. Provisional Patent Application Ser. No. 63/285,252, filed Dec. 2, 2021, entitled SYSTEM ARCHITECTURE AND METHOD OF PROCESSING DATA THEREIN, the contents of which are hereby incorporated by reference in its entirety into the present disclosure.

STATEMENT REGARDING GOVERNMENT FUNDING

This invention was made with government support under ECCS2015025 awarded by the National Science Foundation and under DE-AC05-000R2275 awarded by the Department of Energy. The government has certain rights in the invention.

TECHNICAL FIELD

The present disclosure generally relates to super-resolution microscopy and, in particular, to a method and system utilizing machine learning for improvement thereof.

BACKGROUND

This section introduces aspects that may help facilitate a better understanding of the disclosure. Accordingly, these statements are to be read in this light and are not to be understood as admissions about what is or is not prior art.

Due to the wave nature of light, the spatial resolution of conventional far-field microscopes is fundamentally limited by the diffraction limit to approximately half the wavelength of the incident light, known as the "Abbe limit," named after Ernst Karl Abbe. In 1874 he published a paper entitled "A Contribution to the Theory of the Microscope and the nature of Microscopic Vision," in which he described the inverse proportionality of a microscope resolution to its aperture. Referring to FIG. 1, a diagram intended to show the Abbe limit of optical microscopes, this relationship is visualized. A photon emitting object provides light at various wavelengths (fluorescent light provides most useful information at a wavelength of about 400-500 nm). The light shone on a lens is transmitted onto a detector. When the particle is small (say less than the wavelength divided by 2), it generates a point spread function (PSF) in the XY plane in the form of the Airy lateral circle and rings, with every ring away from the center being less bright. The photoluminescence (PL) map (i.e., map of electromagnetic radiation as a result of emission of photons), which is intensity as a function of XY location, is also shown. The lowest diameter for the XY PSF is thus in the order of 200-250 nm. In the XZ plane, the PSF is more of an oblong shape but even larger in dimension. Abbe's formula is shown in FIG. 1 ($d=\lambda/2 \cdot NA$, where $\lambda$ is the wavelength of light, and NA is the numerical aperture which is about 1 for most aberration-free lenses), thus resulting in the 200-250 nm diffraction limit. This limit poses significant challenges for viewing smaller objects, e.g., in the order of 10's of nm, and particularly when these objects are close to each other, e.g., in the order of 10 s of nm, as the PSFs of these particles begin to merge thus causing partial or complete loss of useful detection.

Given the Abbe diffraction limit, there have been far-field super-resolution microscopy (SRM) techniques that aim at overcoming said limitation. The developed SRM techniques typically break one or more of the underlying fundamental assumptions on the nature of light-matter interaction within the optical system, under which the diffraction limit is derived. Specifically, it is assumed that the illumination intensity is homogenous, the optical response of the stationary object is linear, and all the optical fields in the system are classical. Recently, a plethora of novel super-resolution techniques, including stimulated emission depletion, structured illumination microscopy, photoactivated localization microscopy, and stochastic optical reconstruction microscopy, have been developed. All the aforementioned techniques are realized within classical optical systems via breaking the homogeneity, linearity, or stationarity assumptions.

Another promising SRM technique includes taking into account the quantum nature of light. Several quantum schemes have been proposed utilizing multimode squeezed light and generalized quantum states. These approaches use complex quantum states of light as an illumination source, which demand highly efficient, deterministic sources of such quantum photons or entangled photon pairs. In contrast, several SRMs have been developed by relying on the quantum nature of the light emitted by the object itself. This approach, originally proposed by Hell et al., is based on the fact that some quantum sources emit photons with sub-Poissonian temporal statistics, which can be analyzed by measuring the autocorrelation function of the emission. It has been shown that by analyzing the n-th order autocorrelation function at zero time delay $g^{(n)}(t=0)$ of nonclassical light emitted from a point source, it is possible to reduce the size of the effective point spread function by a factor of $\sqrt{n}$ (square root of n).

Hell et al. proposed the Gedanken experiment in which a photon emitter provides photons to a beam splitter which either allows transmission of the photons to a first detector or reflection of the photons to a second detector. FIG. 2 is a diagram showing the basic schematic of the Gedanken experiment, in which a system 100 was used, including a photon emitter 102 providing photons 104 to a beam splitter 106 that distributes the photons between two detectors $108_a$ and $108_b$. It should be noted that no single photon is allowed to travel to both detectors $108_a$ and $108_b$, as shown in the registers next to each detector, whose outputs are coupled to a correlation device 110. A second-order autocorrelation function (or cross-correlation function between the two detectors) denoted as $g^{(2)}(x, y, 0)$ representing the $2^{nd}$ order autocorrelation at pixel position (x,y) with zero delay is established from the two detectors, thereby establishing the statistical nature of the photon emitter. Said autocorrelation can then be used to generate a super-resolved image $<N(x,y)>^2(1-g^{(2)}(x, y, 0))$ where N (x,y) represents the intensity at pixel position (x,y). In this setup, the beam splitter 106 performs an antibunching function by either transmitting the incoming photon to the first detector $108_a$ or reflecting it to the second detector $108_b$.

The above-described antibunching-based SRM can be coupled with a classical approach to improve the imaging system's resolution further. By combining image scanning microscopy with the second-order quantum photon correlation measurement, a spatial resolution of four times beyond the diffraction limit was achieved with only a modest hardware overhead compared to traditional confocal scanning microscopy. This combination makes the antibunching-based SRM technique a very attractive platform for imaging quantum light sources, as these are typically analyzed using confocal scanning microscopy. The main bottleneck of this framework is the time required for acquiring the time-resolved photon statistics needed to accurately determine the values of the autocorrelation function at zero delay. This accuracy depends on the number of registered correlated photon detection events. For example, a standard protocol for each pixel requires about 1-4 minutes for measurement and postprocessing. Thus, if there are, for example, 1024 pixels in a fully encompassed super-resolved image, the amount of time required to generate the image is on the order of 1024-4096 minutes (i.e., between 17 to 68 hours for one super-resolved image). The time requirement scales up exponentially with the increasing order of the autocorrelation function, making such data manipulations impractical. Hence, to realize scalable and practical antibunching-based SRM, one needs to develop a fast and precise approach to determine n-th order autocorrelation function at zero time delay ($g^{(n)}(t=0)$).

Therefore, there is an unmet need for a novel approach to speed up processing of quantum-based super-resolution microscopy.

SUMMARY

A method of providing super-resolved images of a photon emitting particle is disclosed. The method includes providing a machine-learning (ML) platform, wherein the ML platform is configured to receive pixel-based sparse autocorrelation data and generate a predicted super-resolved image of a photon emitting particle, receiving photons from the photon emitting particle by two or more photon detectors, each generating an electrical pulse associated with receiving an incident photon thereon, generating sparse autocorrelation data from the two or more photon detectors for each pixel within an image area, and inputting the pixel-based sparse autocorrelation data to the ML platform, thereby generating a predicted super-resolved image of the imaging area, wherein the resolution of the super-resolved image is improved by $\sqrt{n}$ as compared to a classical optical microscope limited by Abbe diffraction limit.

A system for generating super-resolved images of a photon emitting particle is also disclosed. The system includes a platform configured to receive a particle for which a super-resolved image is to be generated; a light source configured to illuminate the particle, two or more photon detectors configured to receive photons emanating from the particle, each photon detector generating an electrical pulse associated with receiving an incident photon emanating from the particle thereon, and a computer system having a processor and non-transient memory with software thereon. The computer system is configured to provide a machine-learning (ML) platform; the ML platform is configured to receive pixel-based sparse autocorrelation data associated with the two or more detectors and generate a predicted super-resolved image of the photon emitting particle, generate sparse autocorrelation data from the two or more photon detectors for each pixel within an image area, and input the pixel-based sparse autocorrelation data to the ML platform, thereby generating a predicted super-resolved image of the imaging area, wherein the resolution of the super-resolved image is improved by $\sqrt{n}$ as compared to a classical optical microscope limited by Abbe's diffraction limit.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 6a is a photoluminescence (PL) distribution within an area of 32 by 32 pixels containing one nitrogen-vacancy (NV) center in nanodiamonds dispersed on a coverslip glass substrate.

FIG. 6b is a graph of intensity vs. line coordinates in μm for the original PL and a Gaussian fit cross-section of the diffraction-limited image, taken along the dashed line (see FIG. 6a) which yields a full width half maximum (FWHM=$2\sqrt{2} \ln 2\sigma$) of 310 nm.

FIG. 6c is a reconstructed PL map showing a noisy reconstruction of the $g^{(2)}(x, y, 0)$ due to the sparsity of the HBT histograms.

FIG. 6d is a corresponding super-resolved reconstructed image of $G^{(2)}(x,y)$ of the noisy reconstruction of the $g^{(2)}(x, y, 0)$ of FIG. 6c.

FIG. 6e is a graph of the cross-section of the obtained image of FIG. 6d and corresponding fitting with the same σ value as of the original PL image (FIG. 6a).

FIGS. 6f and 6g are the $2^{nd}$ order autocorrelation ($g^{(2)}(x, y, 0)$) distribution retrieved via using the pre-trained CNN (FIG. 6f) and corresponding super-resolved image (FIG. 6g).

FIG. 6h is a graph of Gaussian fitting of the cross-section distribution of the resolved image, which shows that the ML-assisted approach ensures a FWHM of 219 nm, which corresponds to $\sigma_{CNN}=\sigma/\sqrt{2}$.

DETAILED DESCRIPTION

Figure 1:
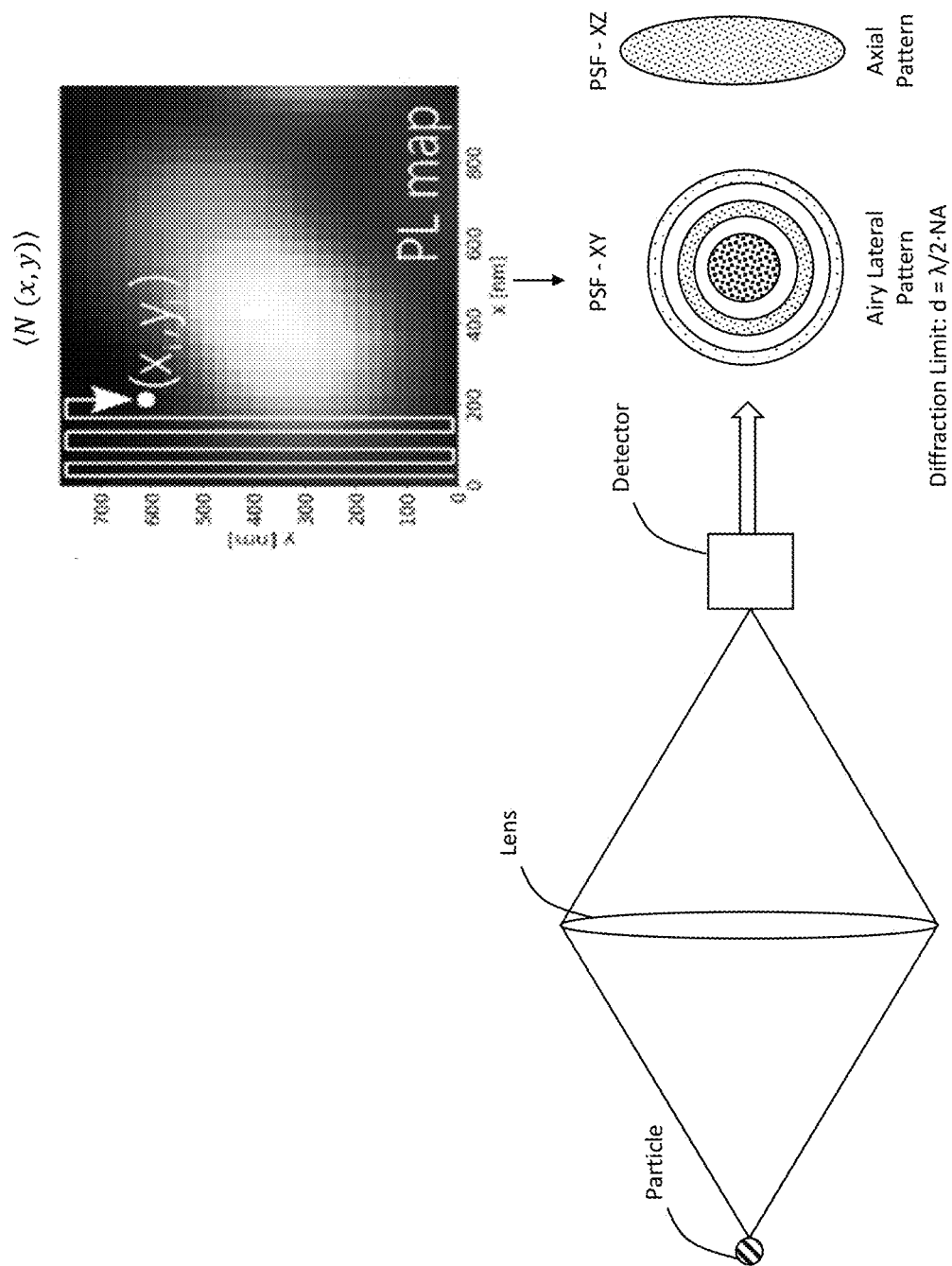
FIG. 1 is a schematic of a classical approach to optical microscopy demonstrating the fundamental diffraction limit.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or a stated limit of a range.

In the present disclosure, the term "substantially" can allow for a degree of variability in a value or range, for example, within 90%, within 95%, or within 99% of a stated value or of a stated limit of a range.

A novel approach is described to speed up the processing of quantum-based super-resolution microscopy. Towards this end, according to the present disclosure, convolutional neural networks (CNNs) are utilized to enable rapid classification of quantum emitters depending on whether $g^{(2)}(0)$ is above or below a given threshold value based on sparse autocorrelation function measurements. Specifically, a CNN-based regression model is disclosed herein that allows an accurate estimation of the $g^{(2)}(0)$ values and thus super-resolved images based on sparse data. Using the developed CNN model, the acquisition time in the antibunching-based scanning SRM technique has been reduced by at least 12 times per pixel, thus marking an important step towards the practical realization of scalable quantum super-resolution imaging devices. According to the present disclosure, the approach can be extended to rapid measurements of higher-order autocorrelation functions, which opens up the way to the practical realization of scalable quantum super-resolution imaging systems. The developed method is compatible with the continuous wave (CW) excitation regime, which reduces emitter photobleaching due to multi-photon absorption and does not restrict the fluorescence lifetime. Therefore, it can be extended and applied to a wide variety of quantum emitters used in biological labeling and quantum on-chip photonics.

The antibunching technique is further described to better elucidate the present disclosed method. The antibunching SRM technique relies on the detection of quantum correlations in the signal radiated by quantum emitters, which allows for a gain in the spatial resolution of a factor of n by measuring n-th order autocorrelation function. This fact can be understood by conducting the Gedanken experiment, as presented in FIG. 2. In the case of a hypothetical emitter that emits photons by pairs, an improvement in resolution can be theoretically obtained by sending each of the two photons to a separate detector. Since the two detectors will record two independent point-spread function (PSF) estimates, the spatial resolution can be improved by a factor of √2 via simple multiplication compared to classical optical microscopy. However, instead of requiring the emitter to emit pairs of photons, one can acquire the same amount of information by assessing the absence of the two-photon correlation in single-photon emission by measuring the second-order autocorrelation function (based on the presence of two detectors). Furthermore, one can achieve an arbitrarily large improvement in resolution by measuring higher-order correlations in the emission of a single photon emitter. In the most general form, the intensity distribution of the super-resolved image based on antibunching SRM $G^{(n)}(x, y)$ can be obtained via retrieving spatial distributions of the n-th order autocorrelation function at zero time delay $g^{(n)}(x, y, \tau=0)$ and the number of detected photons $\tilde{N}(x, y)$ based on $$G^{(n)}(x,y) \sim \langle \tilde{N}(x,y) \rangle^n \Sigma_{i=1}^{i=i_{max}} c_i X_i, \quad (1)$$

where $\langle \tilde{N}(x, y) \rangle$ is the average number of detected photons from a given point (x,y) of the sample, $X_i$ is a function of the product $g^{(i_1)}(x, y, 0)g^{(i_2)}(x, y, 0) \ldots g^{(i_j)}(x, y, 0)$, $i_{max}$ is the number of ordered combinations, fulfilling the condition $\Sigma_{k=1}^{j} j_k = n$. For example, for n=2 case, Eq. (2) takes the simple form:

$$G^{(2)}(x,y) \sim \langle \tilde{N}(x,y) \rangle^2 (1-g^{(2)}(x,y,0)). \quad (2)$$

Figure 2:
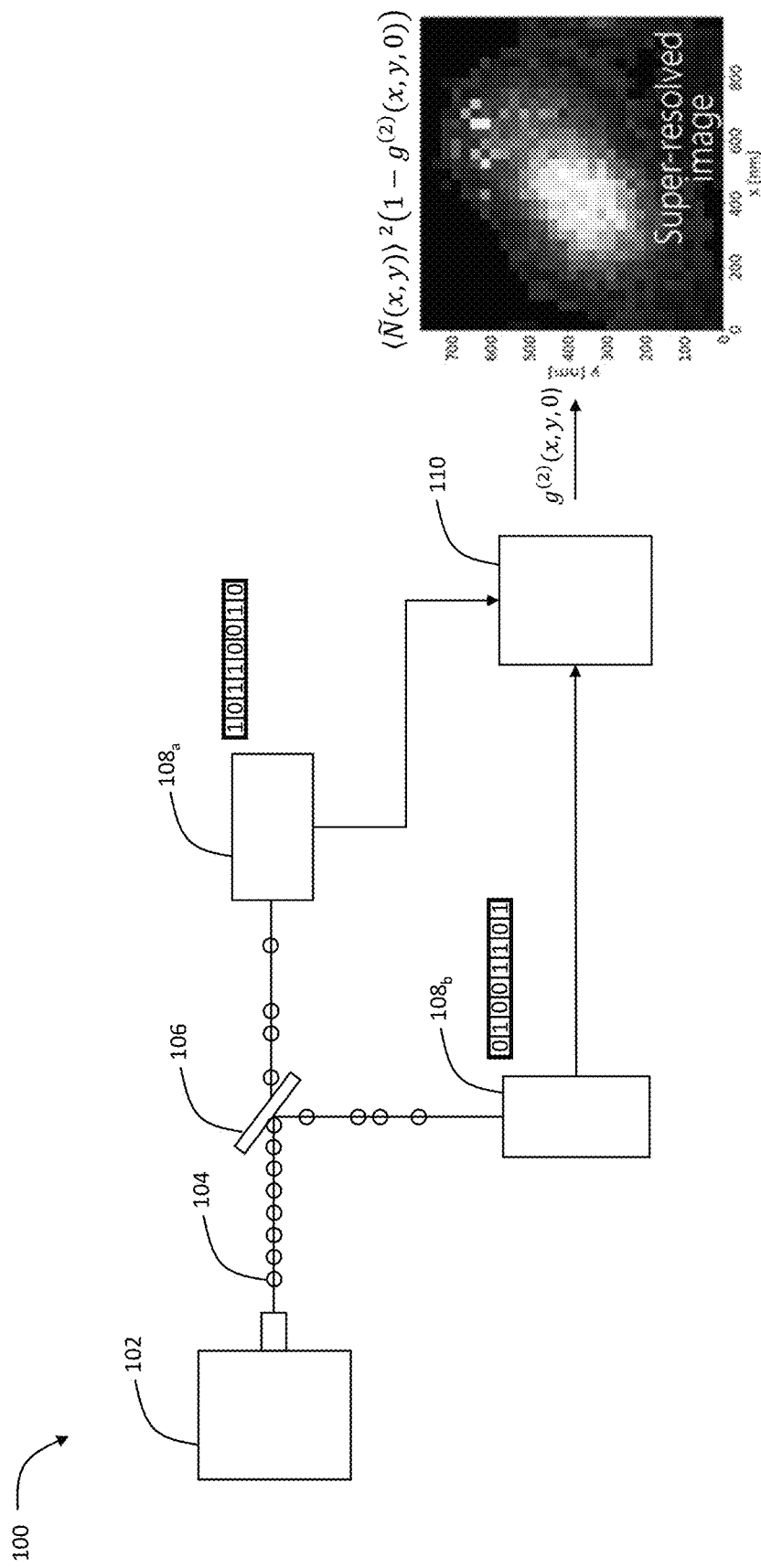
FIG. 2 is a schematic demonstrating the Gedanken setup, including one photon emitting source, two photon detectors, and a correlation device representing the known Hanbury-Brown-Twiss (HBT) interferometry measurement setup.
Figure 3:
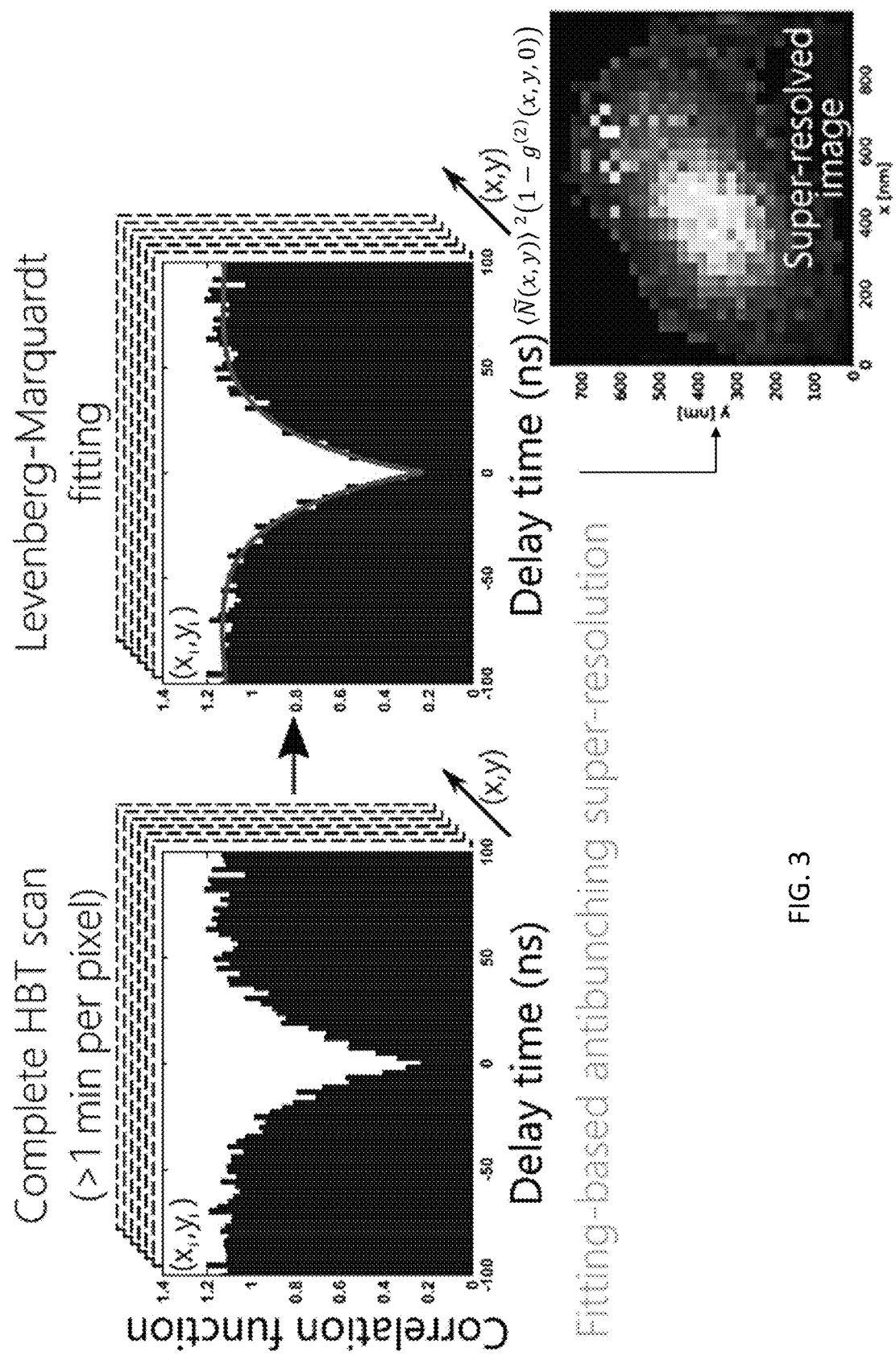
FIG. 3 includes a graph of the correlation function of two detectors as a function of delay time in ns per pixel which can be used to generate a curve fit (Levenberg-Marquardt (LM) curve fit) per pixel which can then provide a super-resolved image of a plurality of pixels in an image area.

The most commonly used approach for retrieving the $g^{(2)}(0)$ value is a Hanbury-Brown-Twiss (HBT) interferometry measurement, composed of a beam-splitter directing the emitted light to two single-photon detectors connected to a correlation board (as shown in FIG. 2). The correlation board registers events consisting of pairs of detector clicks. It then arranges these events into a histogram as a function of the time delay T between the clicks, which can be used for the postprocessing via a curve fitting process, e.g., Levenberg-Marquardt (LM) fitting as provided by:

$$g^{(2)}(\tau) = 1 - a_1 e^{\frac{-\tau}{t_1}} + a_2 e^{\frac{-\tau}{t_2}} \quad (3)$$

where, $a_j$, $t_j$, j=1,2 are the fitting parameters related to the internal dynamics of the emitters. Referring to FIG. 3, the autocorrelation function is shown, indicating almost zero correlation with zero delay, as to be expected since the photons from the emitter can only be transmitted to one detector or reflected to the other detector. FIG. 3 also shows the main steps of the fitting-based approach for the realization of the antibunching SRM technique based on the LM fitting. Specifically, the area of interest is divided into n×m pixels, and autocorrelation histograms are acquired at each pixel. The autocorrelation measurement is performed for several minutes for each pixel. The L-M fitting is done over all HBT histograms, and the corresponding $g^{(2)}(x, y, 0)$ map is retrieved. Finally, the resolved image is calculated via Eq. (2) (as further shown in FIG. 3).

Figure 4A:
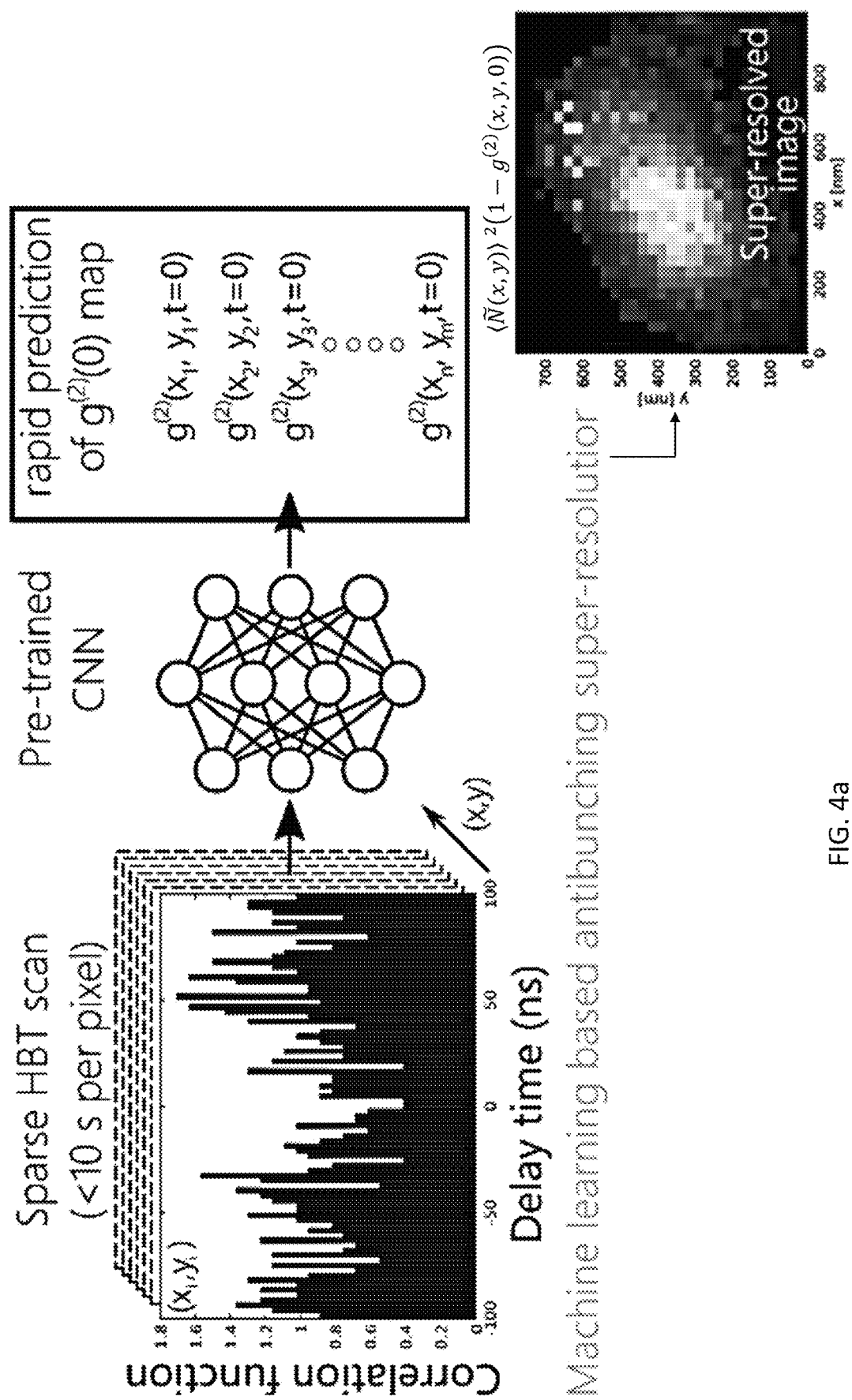
FIG. 4a is a schematic showing how sparse autocorrelation data is used as input data to a convolutional neural network (CNN) pre-trained to generate a super-resolved image.

In the Gedanken experiment, according to the present disclosure, the photon emitter is a single nitrogen-vacancy (NV) centers in nanodiamonds dispersed on a coverslip glass substrate. These emitters typically yield between $10^4$ and $10^5$ counts per second on each of the single-photon detectors in the HBT setup (when in focus) and exhibit fluorescence lifetimes between 10 and 100 ns. During the scan, when the emitters are partially out of focus, the fluorescence counts drop significantly. Consequently, to assess $g^{(2)}(0)$ via Levenberg-Marquardt (L-M) fitting with an uncertainty varying between ±0.01 to ±0.05, autocorrelation histogram acquisition times of 1 min are required per pixel. In the pulsed excitation regime, the fitting is not required to retrieve $g^{(2)}(0)$ as long as the pump repetition period is much longer than the emitter's fluorescence lifetime. However, this requirement becomes somewhat impractical when the emitter lifetime is long, as in the case of NV centers. The developed machine learning approach addresses the aforementioned problem by rapidly estimating the $g^{(2)}(x, y, 0)$ values based on sparse HBT measurement. According to the present disclosure, the machine learning framework is shown in FIG. 4a with additional details shown in FIGS. 5a and 5b. A CNN regression network is trained on a "sparse" autocorrelation data set with short acquisition times. Once trained, the CNN network estimates the $g^{(2)}(0)$ values, requiring an acquisition time of less than 10 s.

With reference to FIG. 4a, a schematic is shown for the main building block of the machine learning assisted antibunching SRM technique, according to the present disclosure, which provides a CNN-based regression model used for retrieving $g^{(2)}(0)$ values. As shown in FIG. 4a, a short (<10 seconds) of the $2^{nd}$ order autocorrelation vs. delay time from two detectors for a pixel is provided to the pre-trained CNN, which then provides the super-resolved image for that pixel. This process is repeated for all pixels, thereby providing the super-resolved image of the object/sample. As discussed above, the prior art requires about 1 to 5 minutes per pixel to provide the super-resolved image, while utilizing the CNN of the present disclosure, this can be reduced by at least a factor of 12, thus significantly improving the processing time. The structure of the CNN, its training and testing, and a comparison of its performance against convention LM fitting are provided below.

As discussed in FIG. 4a, the supervised training of the CNN regression model was performed using an augmented dataset of 5 s-10 s sparse HBT histograms and the corresponding ground truth labels. The training process is realized by performing ADAMAX gradient descent optimization using the KERAS library for 100 epochs with a mean absolute percentage error loss function. In this setup, 80% of the dataset is used for training, while the remaining 20% are used for validation and testing.

Figure 4B:
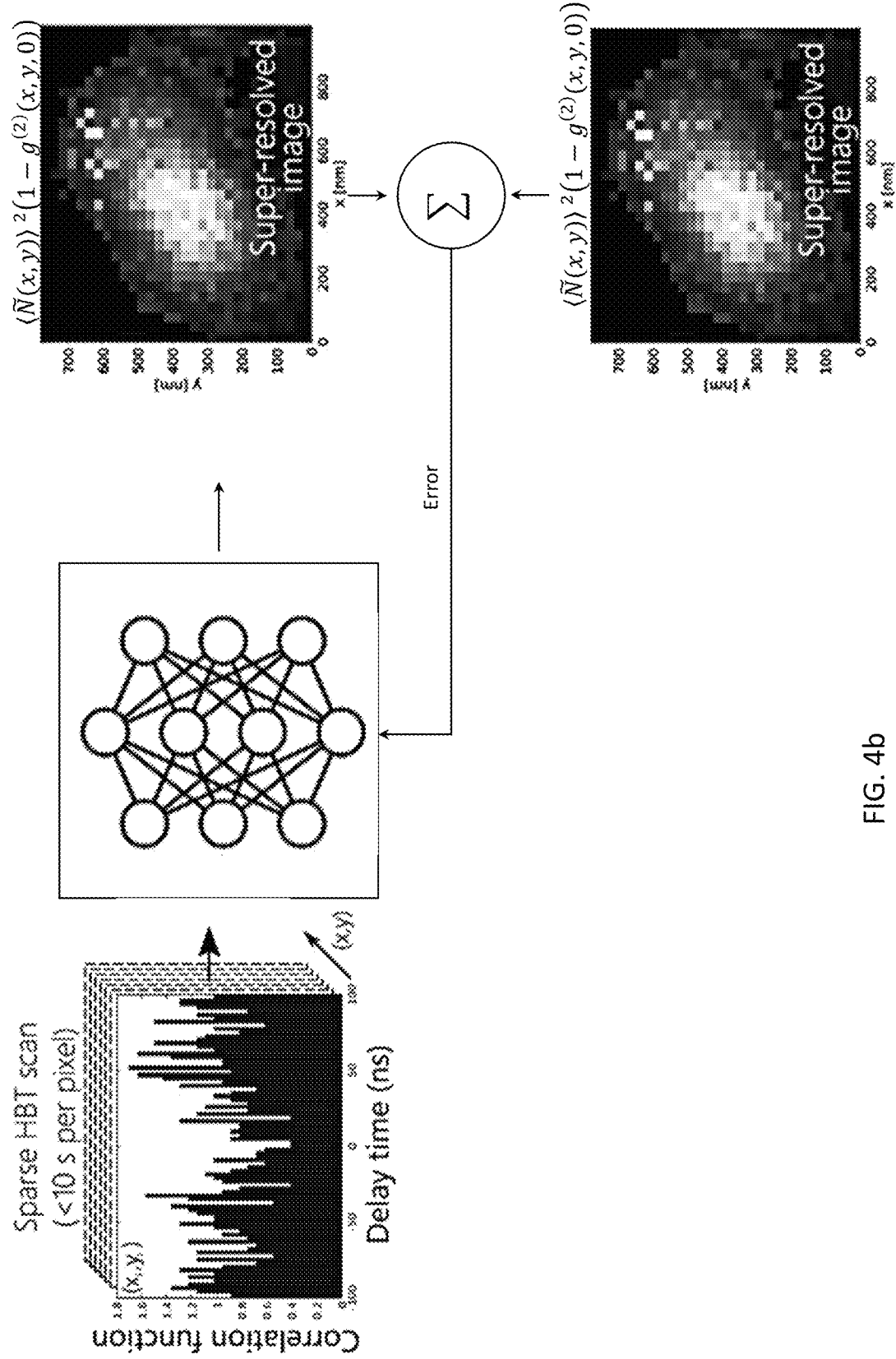
FIG. 4b is a schematic showing how the CNN of FIG. 4a is trained by providing sparse autocorrelation data as input training data. The CNN's out is a predicted super-resolved image that is compared against an experimentally generated super-resolved image.

The training dataset for sparse second-order autocorrelation histograms includes measurements performed on a set of 40 randomly dispersed nanodiamonds with NV centers on a coverslip glass substrate. Referring to FIG. 4b, a schematic is shown describing the process of training the CNN. As shown, sparse $2^{nd}$ order autocorrelation data vs. delay time is provided for each pixel to the CNN as training input data. The CNN generates a predicted super-resolved image for each pixel. The super-resolved image is then compared to the experimental super-resolved image, thus generating an error signal, which is minimized by changing the weights of the CNN in a regression process. Once the weights have been determined, the CNN is considered trained.

Figures 5A, 5B:
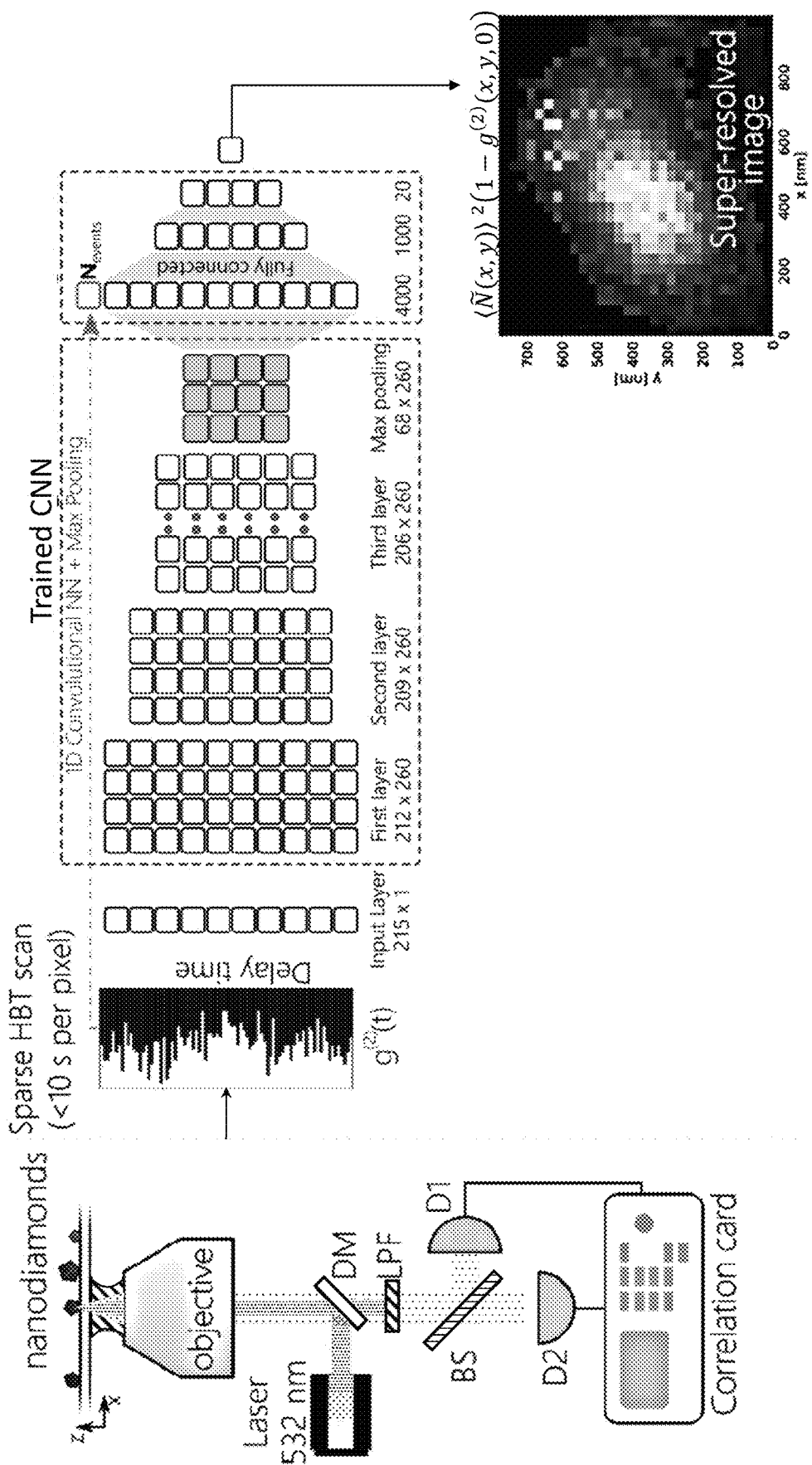
FIG. 5a is a schematic of an experimental setup where a laser energizes a nanodiamond to emit photons which are detected by two detectors after having passed through a beam splitter, where the outputs of the two detectors are provided to a correlation board which provides a sparse HBT autocorrelation data of less than 10 seconds to the trained CNN of FIG. 4a, which then generated the predicted super-resolved image.
FIG. 5b is a schematic is provided depicting the structure of the CNN used for prediction of $g^{(2)}(0)$ and thus the super-resolved image.

Referring to FIGS. 5a and 5b, the CNN and its operation are shown in more detail. FIG. 5a is a schematic of the optical circuit used, according to the present disclosure for the HBT setup. FIG. 5a shows two avalanche detectors (D1, D2) with 30 ps jitter, which are coupled to a pulse correlator with a 4 ps internal jitter. The co-detection events are recorded over a range of 500 ns and collected into 215 equally sized time bins. For each of the 40 emitters, hundreds of sparse autocorrelation histograms with is acquisition time are collected until the total number of co-detection events in their sum allows a precise ground truth ($g^{(2)}(0)$) estimation via L-M fitting with fitting uncertainty varying between ±0.01 to ±0.05. The estimated ground-truth value is then assigned as a label to the entire set of is histograms. Thereafter, all the possible combinations of 1 to 10 of these is histograms are formed to obtain training data that emulated histograms with acquisition times from 1 s to 10 s. Such a data augmentation process assumes that the emission is a process with no memory over times exceeding Is, thus allowing to extend the training dataset significantly.

Referring to FIG. 5b, a schematic is provided depicting the structure of the CNN used for prediction of $g^{(2)}(0)$ and thus the super-resolved image. The CNN includes one input layer, three hidden convolutional layers, one max-pooling layer followed by dropout, three fully connected layers, and one output node generating the super-resolved image. The input layer included 215 nodes corresponding to the number of bins in the input histogram. The feature learning part of the CNN is optimized to capture the salient features of the autocorrelation datasets. In contrast, the regression part is trained to predict $g^{(2)}(0)$ values based on these extracted features. All of the hidden layers comprised 260 filters. The third hidden layer's output is connected with the max-pooling layer, followed by the dropout layer. The kernel size of the filters (4) is chosen to be the same for each layer. Importantly, the CNN takes the total number of two-photon detection events $N_{events}$ in the histogram as an additional input. $N_{events}$ is concatenated to the output of the feature learning part and used as a regularization term during the training process. The 5 s-10 s histograms acquired on pixels, where the contribution of the quantum emission to the total counts is negligible, feature $N_{events} < 4$, while the histograms on areas close to the quantum emitter locations feature $N_{events} = 65$ on average. To populate the "dark" pixels, the CNN regression network is implicitly biased to produce $g^{(2)}(0)=1$, on the datasets with $N_{events} < 4$ counts.

Figure 5C:
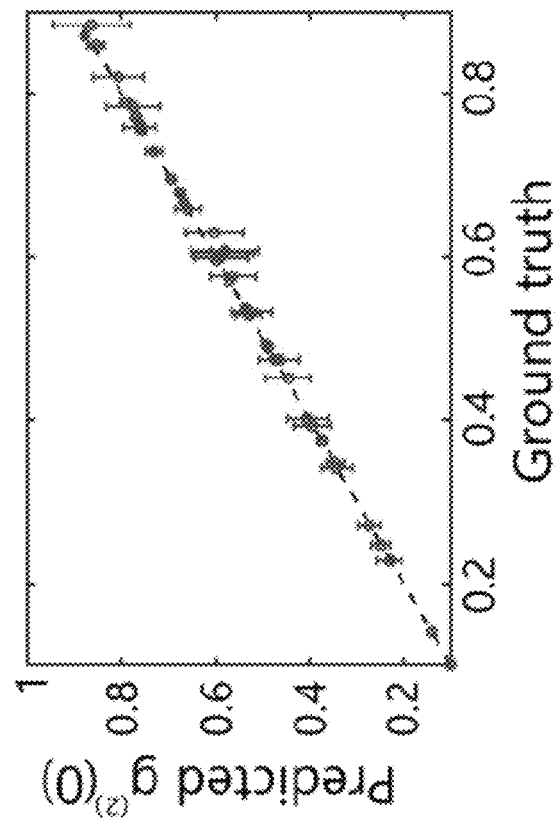
FIG. 5c is a graph of predicted $g^{(2)}(0)$ vs. ground truth based on the LM fitting alone, which shows the regression plot of the LM fitting performed on 5 s HBT histograms.

The performance of the trained CNN regression model is assessed via calculating the mean absolute percentage error (MAPE) and the coefficient of determination ($r^2$) on the 5 s histogram datasets. FIG. 5c is a graph of predicted $g^{(2)}(0)$ vs. ground truth based on the LM fitting alone, which shows the regression plot of the LM fitting performed on 5 s HBT histograms. Dots show the average predicted $g^{(2)}(0)$ value, while error bars show the standard deviation of the predicted value over all the 5 s datasets acquired for a given emitter. Specifically, markers show the average value of the prediction, while error bars show the standard deviation over the set of 5 s histograms belonging to the same emitter. Due to the sparsity of the HBT measurement, the LM fitting expectedly cannot ensure precise fitting of the data, which results in MAPE=32%, $r^2$=70%, and root mean square error (RMSE) of 0.215.

Figure 5D:
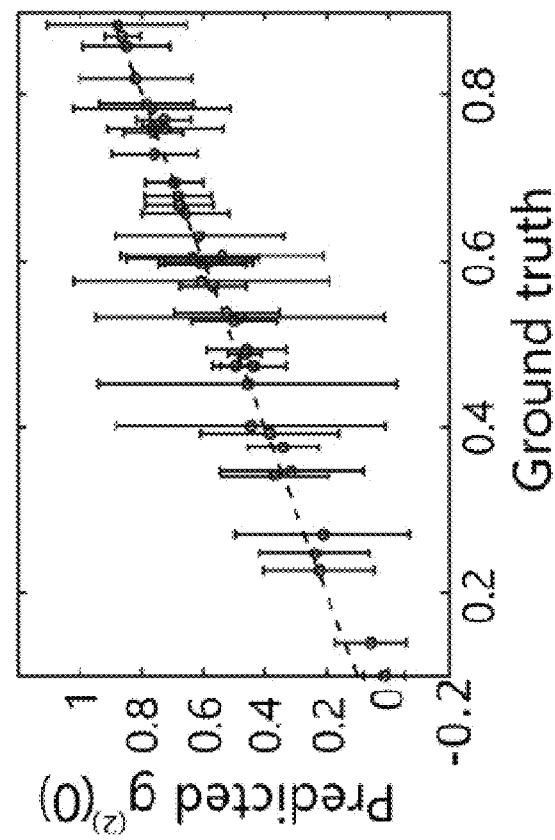
FIG. 5d is another graph of $g^{(2)}(0)$ vs. ground truth utilizing the CNN regression model.

In contrast, the CNN regression model ensures precise predictions of the $g^{(2)}(0)$ values based on 5 s HBT histograms, as indicated in FIG. 5d, which is another graph of $g^{(2)}(0)$ vs. ground truth utilizing the CNN regression model. Dots show the average predicted $g^{(2)}(0)$ value, while error bars show the standard deviation of the predicted value over all the 5 s datasets acquired for a given emitter. Due to the ability of the CNN network to learn hidden correlations between signature features of the sparse datasets and the ground truth labels, the CNN regression model shows excellent performance on the sparse dataset and ensures low MAPE (5%), a high coefficient of determination of 93% and RMSE of 0.0018. The CNN performance is also robust against the reduction of the acquisition time. The performance of both approaches was analyzed on 5 s, 6 s, and 7 s HBT datasets. The performance of the direct fitting ensures 30% and 27% MAPE when applied to 6 s and 7 s HBT measurements, respectively. A comparison between the LM fitting approach and the CNN approach shows that the CNN regression model ensures a much more robust performance than LM fitting. It ensures 3.92% MAPE on 6 s HBT datasets and reaches up to 3.58% MAPE when applied to 7 s datasets.

The benchmarking of the ML-assisted regression of autocorrelation data enables the experimental demonstration of the ML-assisted antibunching SRM. The experiment is realized on a sample of randomly dispersed nanodiamonds with NVs on a glass substrate. In this demonstration, the objective is scanned using a piezo-stage with sub-10 nm resolution over the 775×775 nm$^2$ region of interest, which is divided into 1024 (32×32) pixels and contains one nanodiamond with a single NV center. Autocorrelation measurements are performed on each pixel in 1 s time increments with a 7 s total acquisition time per pixel. Along with the autocorrelation data, the corresponding photoluminescence (PL) map is retrieved, which is shown in FIG. 6a, which is a PL distribution within the area of 32 by 32 pixels containing one NV center.

A graph of intensity vs. line coordinates in μm for the original PL and a Gaussian fit cross-section of the diffraction-limited image, taken along the dashed line (see FIG. 6a), is shown in FIG. 6b. Gaussian fitting of the intensity distribution yields a full width half maximum (FWHM=2√2 ln 2σ) of 310 nm. By LM fitting the 5 s sparse histograms of each pixel, the $g^{(2)}(x, y, 0)$ map is retrieved. Due to the sparsity of the HBT histograms, the L-M fitting expectedly leads to a noisy reconstruction of the $g^{(2)}(x, y, 0)$ distribution (as shown in the reconstructed PL of FIG. 6c). FIG. 6d shows the corresponding reconstructed image of $G^{(2)}(x, y)$ (based on Eq. 3). The cross-section of the obtained image and corresponding fitting with the same a value as of the original PL image are shown in FIG. 6e. It should be noted that the $g^{(2)}(x, y, 0)$ obtained via L-M fitting leads to a noisy, blurred image without any gain in spatial resolution, which is a direct consequence of the inaccurate retrieval of the $g^{(2)}(x, y, 0)$. In contrast, the CNN-based antibunching SRM ensures the expected √2 gain in resolution on a sparse 7 s HBT scan. FIGS. 6f and 6g show $g^{(2)}(x, y, 0)$ distribution retrieved via using the pre-trained CNN (FIG. 6f) and corresponding super-resolved image (FIG. 6g). It should be noted that ML-based framework ensures precise reconstruction of the $g^{(2)}(x, y, 0)$ map, and as a result, achieves a √2 gain in the spatial resolution of the reconstructed image. Gaussian fitting of the cross-section distribution of the resolved image shows that ML assisted approach ensures a FWHM of 219 nm, which corresponds to $\sigma_{CNN}=\sigma/\sqrt{2}$ (as shown in FIG. 6h).

Figures 7A, 7B, 7C, 7D:
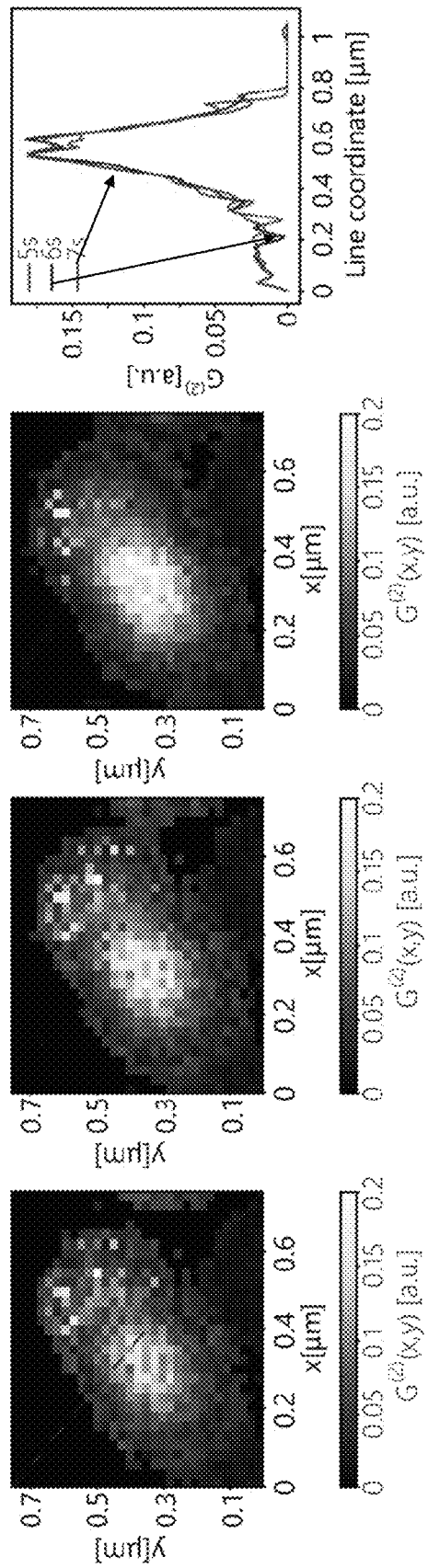
FIGS. 7a, 7b, and 7c are PL maps of reconstructed images based on the ML approach using smaller amounts of time (i.e., 5 s, 6 s, and 7 s HBT scans, respectively).
FIG. 7d is a graph of $G^{(2)}$ vs. line coordinate in μm, which compares a cross-section shown in FIG. 7a for all three images shown in FIGS. 7a, 7b, and 7c, which appear stable against the reduction of the acquisition time.

Up to this point, an acquisition time of 7 s per pixel has been considered. However, the robustness of the regression model indicates that the developed approach can be efficiently applied to more sparse datasets. FIGS. 7a, 7b, and 7c show the reconstructed images based on 5 s, 6 s, and 7 s HBT scans, respectively, and FIG. 7d compares their cross-sections, which appear stable against the reduction of the acquisition time. It is worth noting that the fitting-based approach requires at least 1 min of HBT measurement per pixel for precise retrieval of the $g^{(2)}(0)$ values, as it has been observed during the dataset collection process discussed above. This time requirement significantly depends on the properties of the single-photon emitters, e.g., quantum purity, lifetime, and emission rate, and can be significantly longer in the case of low emission rates of the emitter. As a result, the developed ML-assisted anti-bunching approach ensures up to 12 times speed-up compared with the fitting-based approach.

Figure 8C:
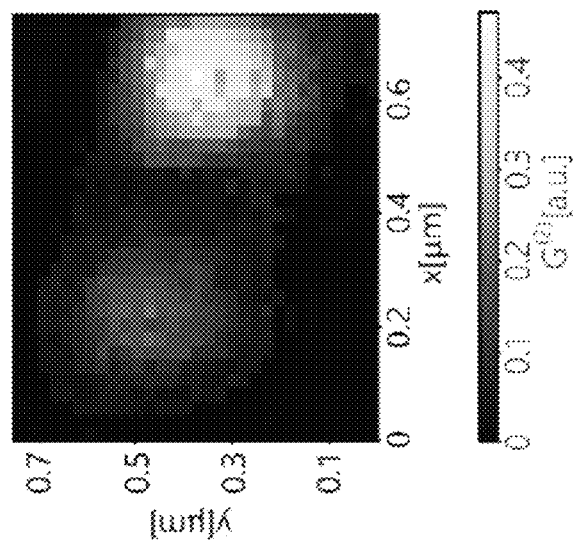
FIGS. 8a, 8b, and 8c are PL distributions for two closely positioned particles with FIG. 8a providing raw intensity, FIG. 8b providing CNN-based retrieved $1-g^{(2)}(x, y, 0)$ map, and FIG. 8c providing the CNN-based resolved super-resolved image ($G^{(2)}$) of the two NVs separated by about 600 nm distance.
Figure 8B:
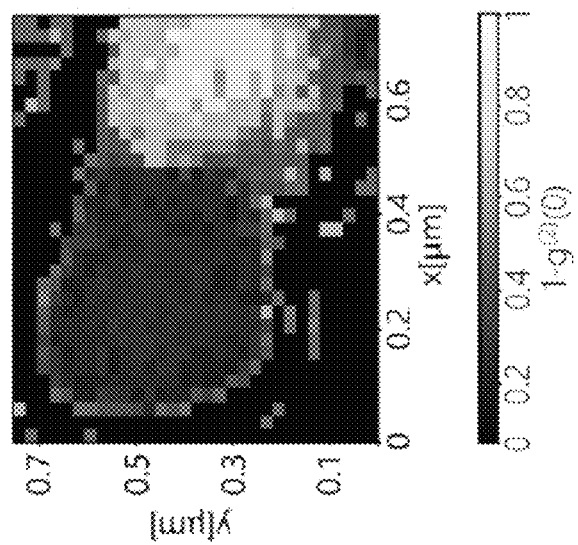
Figure 8A:
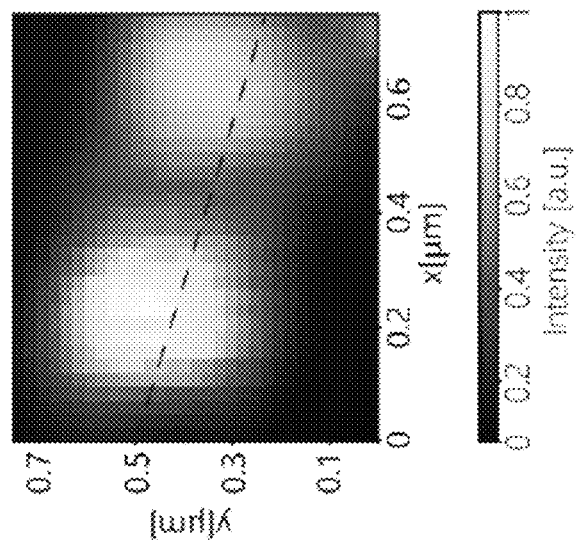
Figure 8E:
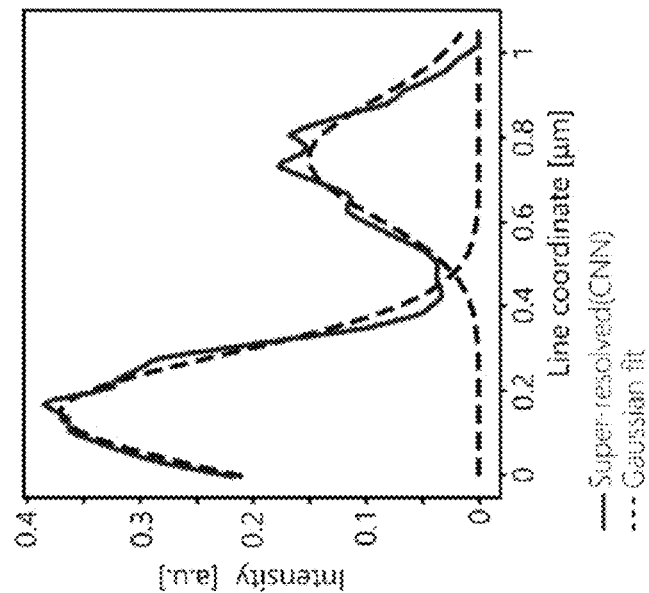
FIGS. 8d and 8e are graphs of intensity vs. line coordinates in μm showing Gaussian fitting of the cross-section (taken along the dashed line in FIG. 8a), demonstrating one can retrieve the FWHM values of each of the lobes, which are equal to about 465 nm (as shown in FIG. 8d), and by performing the same fitting on the resolved image, √2 narrowing of the emission features (FWHM=330 nm) by the CNN based approach is confirmed in FIG. 8e.
Figure 8D:
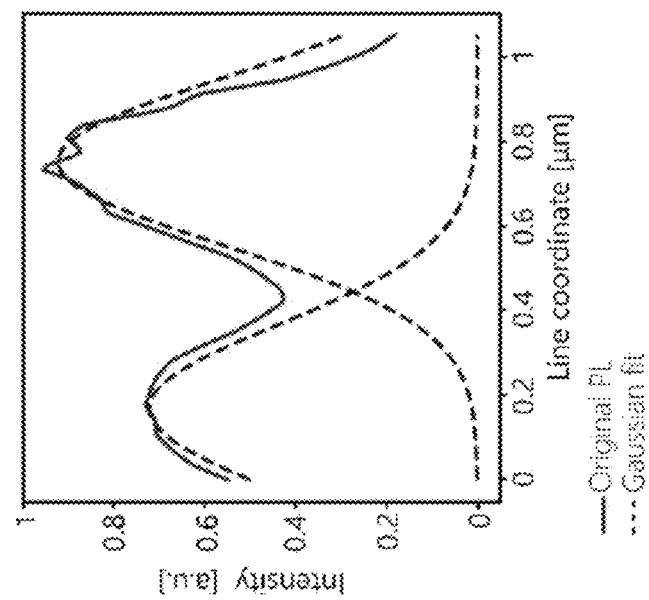

The developed ML-assisted SRM is also capable of resolving closely spaced quantum emitters. FIGS. 8a, 8b, and 8c show the PL distribution (FIG. 8a), CNN-based retrieved $1-g^{(2)}(x, y, 0)$ map (FIG. 8b) and the CNN-based resolved image of the two NVs separated by ~600 nm distance (FIG. 8c). By comparing the original PL distribution and the resolved image, the expected √2 improvement in the spatial resolution is observed. By performing the Gaussian fitting of the cross-section (taken along the dashed line in FIG. 8a), one can retrieve the FWHM values of each of the lobes, which are equal to about 465 nm (as shown in FIG. 8d). By performing the same fitting on the resolved image, √2 narrowing of the emission features (FWHM=330 nm) by the CNN based approach is confirmed (FIG. 8e).

Figures 9A, 9B:
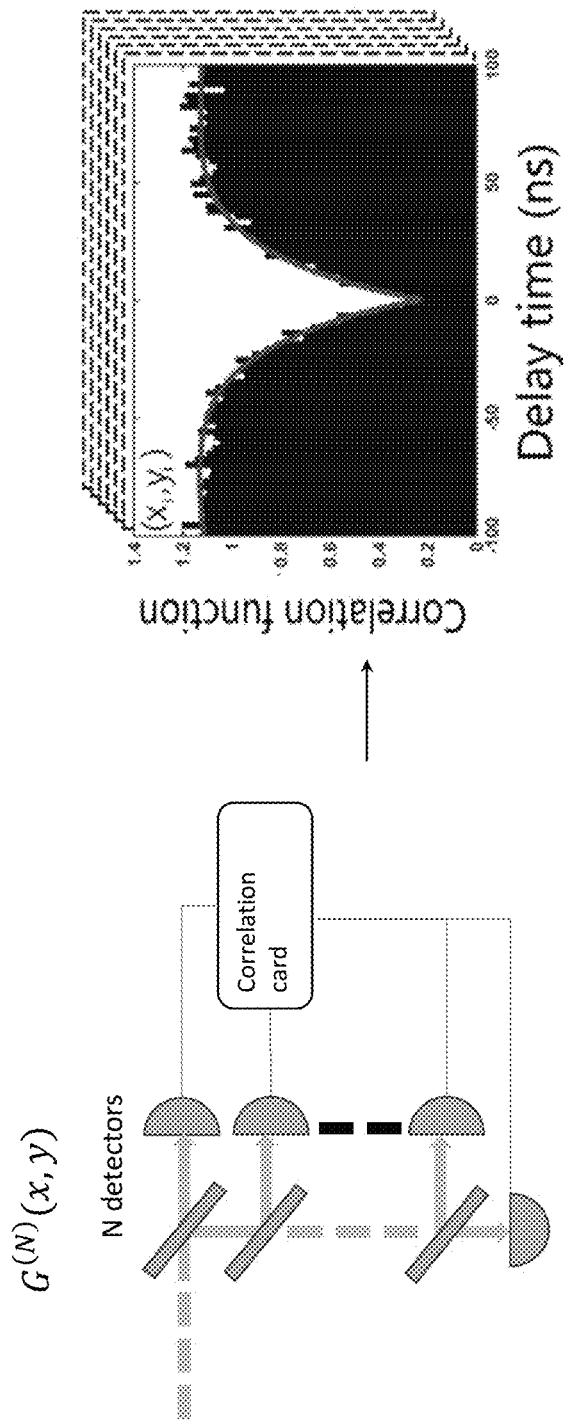
FIG. 9a is a graph of n detectors, all of which are coupled to a correlation card configured to provide an $n^{th}$ order correlation function vs. delay time in ns, shown in FIG. 9b.
FIG. 9b is a graph of correlation function vs. delay time in ns.

While a significant portion of the present disclosure is directed to two detectors, and thus $2^{nd}$ order autocorrelation data associated with these two detectors, no such limitation is intended herein. Specifically, the present disclosure is also intended to cover higher orders based on an additional number of detectors. Specifically referring to FIG. 9a, a schematic of higher number of detectors is shown, resulting in an $n^{th}$ order autocorrelation function vs. delay time in ns shown in FIG. 9b.

It should be appreciated that both data from curve-fit autocorrelation ($2^{nd}$, $n^{th}$ order) function (i.e., the LM curve-fit discussed above) or actual raw experimental data without curve fitting can be used to train the CNN.

Those having ordinary skill in the art will recognize that numerous modifications can be made to the specific implementations described above. The implementations should not be limited to the particular limitations described. Other implementations may be possible.

The invention claimed is:

1. A method of providing super-resolved images of a photon emitting particle, comprising:
   providing a machine-learning (ML) platform, wherein the ML platform is configured to receive pixel-based sparse autocorrelation data and generate a predicted super-resolved image of a photon emitting particle;
   receiving photons from the photon emitting particle by two or more photon detectors, each generating an electrical pulse associated with receiving an incident photon thereon;
   generating sparse autocorrelation data from the two or more photon detectors for each pixel within an image area; and
   inputting the pixel-based sparse autocorrelation data to the ML platform, thereby generating a predicted super-resolved image of the imaging area, wherein the resolution of the super-resolved image is improved by √n as compared to a classical optical microscope limited by Abbe diffraction limit.

2. The method of claim 1, wherein n is 2.

3. The method of claim 2, wherein processing speed of generating the super-resolved image is improved by at least 12 times as compared to a non-ML arrangement.

4. The method of claim 1, wherein the ML platform is a convolutional neural network (CNN).

5. The method of claim 1, training of the ML platform, comprising:
- providing the pixel-based generated sparse autocorrelation data from the two or more photon detectors to the ML platform in training;
- generate a predicted super-resolved image for all pixels within the imaging area;
- compare the predicted super-resolved image for all pixels with a super-resolved image generated experimentally from a full dataset, thereby generating an error signal; and
- minimizing the error signal by altering characteristics of the ML platform.

6. The method of claim 5, wherein the experimentally generated super-resolved image is based on:

$$G^{(n)}(x,y) \sim \langle \tilde{N}(x,y) \rangle^n \Sigma_{i=1}^{i=i_{max}} c_i X_i,$$

where $\langle \tilde{N}(x, y) \rangle$ is the average number of detected photons from a given point (x,y) of the imaging area, $X_i$ is a function of the product $g^{(i_1)}(x, y, 0) g^{(i_2)}(x, y, 0) \ldots g^{(i_l)}(x, y, 0)$, and $i_{max}$ is the number of ordered combinations, fulfilling the condition $\Sigma_{k=1}^{l} j_k = n$.

7. The method of claim 6, wherein if n=2 (2 detectors) $G^{(2)}(x,y)$ is expressed by:

$$G^{(2)}(x,y) \sim \langle \tilde{N}(x,y) \rangle^2 (1 - g^{(2)}(x,y,0)).$$

8. The method of claim 7, wherein the $2^{nd}$ order autocorrelation function is expressed by Levenberg-Marquardt (LM) fitting:

$$g^{(2)}(\tau) = 1 - a_1 e^{\frac{-\tau}{t_1}} + a_2 e^{\frac{-\tau}{t_2}}$$

where, $a_j$, $t_j$, j=1,2 are the fitting parameters related to internal dynamics of the photon emitters.

9. The method of claim 8, wherein the ML platform is a convolutional neural network.

10. The method of claim 6, wherein the error minimization is based on gradient descent.

11. A system for generating super-resolved images of a photon emitting particle, comprising:
- a platform configured to receive a particle for which a super-resolved image to be generated;
- a light source configured to illuminate the particle;
- two or more photon detectors configured to receive photons emanating from the particle, each photon detector generating an electrical pulse associated with receiving an incident photon emanating from the particle thereon; and
- a computer system having a processor and non-transient memory with software thereon configured to:
  - provide a machine-learning (ML) platform, the ML platform is configured to receive pixel-based sparse autocorrelation data associated with the two or more detectors and generate a predicted super-resolved image of the photon emitting particle;
  - generate sparse autocorrelation data from the two or more photon detectors for each pixel within an image area; and
  - input the pixel-based sparse autocorrelation data to the ML platform, thereby generating a predicted super-resolved image of the imaging area, wherein the resolution of the super-resolved image is improved by $\sqrt{n}$ as compared to a classical optical microscope limited by Abbe's diffraction limit.

12. The system of claim 11, wherein n is 2.

13. The system of claim 12, wherein processing speed of generating the super-resolved image is improved by at least 12 times as compared to a non-ML arrangement.

14. The system of claim 11, wherein the ML platform is a convolutional neural network (CNN).

15. The system of claim 11, training of the ML platform, comprising:
- providing the pixel-based generated sparse autocorrelation data from the two or more photon detectors to the ML platform in training;
- generate a predicted super-resolved image for all pixels within the imaging area;
- compare the predicted super-resolved image for all pixels with a super-resolved image generated experimentally from a full dataset, thereby generating an error signal; and
- minimizing the error signal by altering characteristics of the ML platform.

16. The system of claim 15, wherein the experimentally generated super-resolved image is based on:

$$G^{(n)}(x,y) \sim \langle \tilde{N}(x,y) \rangle^n \Sigma_{i=1}^{i=i_{max}} c_i X_i,$$

where $\langle \tilde{N}(x, y) \rangle$ is the average number of detected photons from a given point (x,y) of the imaging area, $X_i$ is a function of the product $g^{(i_1)}(x, y, 0) g^{(i_2)}(x, y, 0) \ldots g^{(i_l)}(x, y, 0)$, and $i_{max}$ is the number of ordered combinations, fulfilling the condition $\Sigma_{k=1}^{l} j_k = n$.

17. The system of claim 16, wherein if n=2 (2 detectors) $G^{(2)}(x,y)$ is expressed by:

$$G^{(2)}(x,y) \sim \langle \tilde{N}(x,y) \rangle^2 (1 - g^{(2)}(x,y,0)).$$

18. The system of claim 17, wherein the $2^{nd}$ order autocorrelation function is expressed by Levenberg-Marquardt (LM) fitting:

$$g^{(2)}(\tau) = 1 - a_1 e^{\frac{-\tau}{t_1}} + a_2 e^{\frac{-\tau}{t_2}}$$

where, $a_j$, $t_j$, j=1,2 are the fitting parameters related to internal dynamics of the photon emitters.

19. The system of claim 18, wherein the ML platform is a convolutional neural network.

20. The system of claim 16, wherein the error minimization is based on gradient descent.

* * * * *